Patented Apr. 4, 1944

2,345,633

UNITED STATES PATENT OFFICE 2,345,633

MANUFACTURE OF PYRIDINE-4.5-DICARBOXYLIC ACID COMPOUNDS

Walter Salzer and Hans Henecka, Wuppertal-Elberfeld, Germany, assignors to Winthrop Chemical Company, Inc., New York, N. Y., a corporation of New York No Drawing. Application January 26, 1940, Serial No. 315,758. In Germany February 8, 1939

10 Claims. (Cl. 260—297.5)

This invention relates to a process of preparing 2-methyl-3-alkoxy pyridine-4.5-dicarboxylic acid compounds.

In accordance with the present invention 2-methyl-3-alkoxy-pyridine-4.5-dicarboxylic acid compounds are obtainable by nitrating 3-alkoxyquinaldine-4-carboxylic acids by means of usual nitrating agents, whereby the nitro group enters into the benzene ring of the quinaldine ring system; the bz-nitro-3-alkoxyquinaldine-4-carboxylic acids are then reduced to the corresponding amino compounds by means of reducing agents usual for converting nitro into amino groups, the bz-amino-3-alkoxyquinaldine-4-carboxylic acids thus obtainable are then converted into 2-methyl-3-alkoxypyridine-4.5.6-tricarboxylic acid by oxidation and the latter compounds are decarboxylated to the 2-methyl-3-alkoxy-pyridine-4.5-dicarboxylic acids. The initial materials which are obtainable for instance by alkylating 3-hydroxyquinaldine-4-carboxylic acids and by saponification of the 3-alkoxyquinaldine-4-carboxylic acids primarily formed are nitrated, for instance, by means of usual nitrating mixtures of nitril and sulfuric acid. The reduction of the nitro compound may be performed, for instance, while using iron as the reducing agent. The oxidation of the bz-amino-3-alkoxyquinaldine-4-carboxylic acids is preferably effected by means of a permanganate in alkaline solution. The 2-methyl-3-alkoxy-pyridine-4.5.6-tricarboxylic acids are decarboxylated by heat treatment, advantageously by boiling the tricarboxylic acid with an organic acid anhydride such as for instance acetic anhydride; upon such treatment the carboxylic group standing in 6-position is split off and the anhydride of the 2-methyl-3-alkoxy pyridine-4.5-dicarboxylic acid is formed. The 2-methyl-3-alkoxy pyridine-4.5.6-tricarboxylic acids may also be heated as such or in the presence of a diluent, such as for instance acetic acid, phenols, polyhalogen benzenes or naphthalenes, paraffin oil or the like to temperatures above 100° C., preferably to a temperature from about 150 to about 250° C. until the development of carbon dioxide has finished. The 2-methyl-3-alkoxy pyridine-4.5-dicarboxylic acid anhydrides which may be primarily obtained upon such treatment may be transformed into the corresponding dicarboxylic acids by heating with water. The reaction may also be carried out with 3-alkoxyquinaldine-4-carboxylic acids which are substituted in the benzene ring by alkyl, halogen or further alkoxy groups, the said substituents being lost in the oxidation stage. The starting materials are obtainable from correspondingly substituted isatines according to German Patent 615,743.

The invention is illustrated by the following example without being restricted thereto:

Example 480 grams of 3-hydroxyquinaldine-4-carboxylic acid are covered with 4 liters of acetone. The mixture is heated to boiling and after the addition of 730 grams of pulverized potassium carbonate while vigorously stirring. Thereupon 615 grams of dimethylsulfate are slowly added drop by drop to the mixture within 2–3 hours; the mixture is then further heated for 2 hours. After cooling the acetone solution is separated from the salts, the acetone distilled off from the filtrate and the oily residue is purified by distillation in a high vacuo. The 3-methoxyquinaldine-4-carboxylic acid methylester is thus obtained as a light-yellow, viscous oil which boils under 3 mms. pressure at 160° C.

231 grams of the above-mentioned ester are dissolved in 500 ccs. of alcohol. The mixture is heated to boiling after the addition of 375 ccs. of 4-normal potassium hydroxide solution for 1 hour. After cooling of the mixture the alcohol is removed under reduced pressure and the 3-methoxyquinaldine-4-carboxylic acid is precipitated from the cold alkaline solution by the addition of 375 ccs. of 4-normal hydrochloric acid in nearly colorless crystals; they are filtered with suction, washed with water and dried.

100 grams of the 3-methoxyquinaldine-4-carboxylic acid thus obtained are introduced while cooling with ice-water into 300 ccs. of concentrated sulfuric acid. A mixture of 50 grams of nitric acid (specific gravity=1.4) and 150 ccs. of concentrated sulfuric acid is added to the solution while permanently cooling in such a way that the temperature does not exceed $+10°$ C. After 1–2 hours' standing the mixture is poured on to finely divided ice and the acid is neutralized in the solution thus obtained by the addition of ammonia until it reacts neutral to Congo. The bz-nitro-3-methoxyquinaldine-4-carboxylic acid precipitating is filtered with suction, washed with water and for reduction purposes gradually poured into a boiling mixture of 550 grams of iron, 770 ccs. of water and 6–10 ccs. of glacial acetic acid while vigorously stirring. Thereupon the solution is heated to boiling for 2 hours, the hot reaction mixture is treated with sodium hydroxide solution until it just reacts alkaline and filtered with suction while hot from iron sludge. The bz-amino-3-methoxyquinaldine-4-carboxylic acid is obtained from the filtrate on treatment with dilute acetic acid as a light orange-red, finely crystalline mass which is filtered with suction and dried. It melts at 240° C. while foaming up.

21.5 grams of the afore-mentioned acid are introduced into a solution of 26 grams of barium hydroxide in 500 ccs. of water. The solution of the barium salt is slowly treated while cooling with ice with a solution of 75 grams of barium permanganate in 1500 ccs. of water in such a way that the reaction temperature does not exceed +10° C. When the addition has been finished the solution is heated for a short time on the boiling water-bath and the hot solution freed from the manganese dioxide by means of filtration with suction. The manganese dioxide is extracted by boiling with water several times and the barium precipitated from the united filtrates as barium sulfate by the addition of a just sufficiently great quantity of dilute sulfuric acid. After the separation of the barium sulfate the filtrate is evaporated to dryness under reduced pressure, whereupon the 2-methyl-3-methoxy-pyridine-4.5.6-tricarboxylic acid precipitates from the concentrated solution as a light-yellow finely crystalline powder. The acid is rather readily soluble in water and glacial acetic acid, more difficultly, however, in alcohol or acetone, insoluble in ether. The acid melts with decomposition at 205-215° C.

1 part by weight of the 2-methyl-3-methoxy-pyridine-4.5.6-tricarboxylic acid thus obtained is covered with the 10-fold quantity by weight of acetic anhydride. The mixture is heated to 130-135° C. until the acid is dissolved and the evolution of carbon dioxide has ceased. The solution thus obtained is evaporated under reduced pressure, the residue dissolved in chloroform, the solution freed from undissolved impurities by filtration, and the chloroform evaporated from the solution. The 2-methyl-3-methoxypyridine-4.5-dicarboxylic anhydride is thus obtained as an oil which distils at a temperature of 100° C. in the heating-bath and under 0.1 mm. pressure as a colorless oil which upon rubbing at once solidifies to crystals. It melts at 65-67° C. By treatment of this anhydride with a small quantity of water the 2-methyl-3-methoxypyridine-4.5-dicarboxylic acid is obtained herefrom which after recrystallization from water melts at 218° C. while foaming up.

We claim:

1. The process which comprises nitrating a 3-alkoxy-quinaldine-4-carboxylic acid by means of a nitrating agent, reducing the bz-nitro-3-alkoxy-quinaldine-4-carboxylic acid to the corresponding bz-amino compound by a reducing agent, converting the amino compound into a 2-methyl-3-alkoxy pyridine-4.5.6-tricarboxylic acid by oxidation, and decarboxylating the latter product to a 2-methyl-3-alkoxy pyridine-4.5-dicarboxylic acid compound by heat treatment.

2. The process which comprises nitrating a 3-methoxy-quinaldine-4-carboxylic acid by means of a nitrating agent, reducing the bz-nitro-3-methoxy-quinaldine-4-carboxylic acid to the corresponding bz-amino compound by a reducing agent, converting the amino compound into a 2-methyl-3-methoxy pyridine-4.5.6-tricarboxylic acid by oxidation, and decarboxylating the latter product to a 2-methyl-3-methoxy pyridine-4.5-dicarboxylic acid compound by heat treatment.

3. The process which comprises nitrating a 3-alkoxy-quinaldine-4-carboxylic acid by means of a nitrating agent, reducing the bz-nitro-3-alkoxy-quinaldine-4-carboxylic acid to the corresponding bz-amino compound by a reducing agent, converting the amino compound into a 2-methyl-3-alkoxy pyridine-4.5.6-tricarboxylic acid by oxidation with permanganate in the presence of alkali and decarboxylating the latter product to a 2-methyl-3-alkoxy pyridine-4.5-dicarboxylic acid compound by heat treatment.

4. The process which comprises nitrating a 3-methoxy-quinaldine-4-carboxylic acid by means of a nitrating agent, reducing the bz-nitro-3-methoxy-quinaldine-4-carboxylic acid to the corresponding bz-amino compound by a reducing agent, converting the amino compound into a 2-methyl-3-methoxy pyridine-4.5.6-tricarboxylic acid by oxidation with permanganate in the presence of alkali and decarboxylating the latter product to a 2-methyl-3-methoxy pyridine-4.5-dicarboxylic acid compound by heat treatment.

5. The process which comprises nitrating a 3-alkoxy-quinaldine-4-carboxylic acid by means of a nitrating agent, reducing the bz-nitro-3-alkoxy-quinaldine-4-carboxylic acid to the corresponding bz-amino compound by a reducing agent, converting the amino compound into a 2-methyl-3-alkoxy pyridine-4.5.6-tricarboxylic acid by oxidation, and decarboxylating the latter product to a 2-methyl-3-alkoxy pyridine-4.5-dicarboxylic acid compound by heat treatment above 100° C. in the presence of a diluent.

6. The process which comprises nitrating a 3-alkoxy-quinaldine-4-carboxylic acid by means of a nitrating agent, reducing the bz-nitro-3-alkoxy-quinaldine-4-carboxylic acid to the corresponding bz-amino compound by a reducing agent, converting the amino compound into a 2-methyl-3-alkoxy pyridine-4.5.6-tricarboxylic acid by oxidation with permanganate in the presence of alkali and decarboxylating the latter product to a 2-methyl-3-alkoxy pyridine-4.5-dicarboxylic acid compound by heat treatment above 100° C. in the presence of a diluent.

7. The process which comprises nitrating a 3-methoxy-quinaldine-4-carboxylic acid by means of a nitrating agent, reducing the bz-nitro-3-methoxy-quinaldine-4-carboxylic acid to the corresponding bz-amino compound by a reducing agent, converting the amino compound into a 2-methyl-3-methoxy pyridine-4.5.6-tricarboxylic acid by oxidation with permanganate in the presence of alkali and decarboxylating the latter product to a 2-methyl-3-methoxy pyridine-4.5-dicarboxylic acid compound by heat treatment above 100° C. in the presence of a diluent.

8. The process which comprises nitrating a 3-methoxy-quinaldine-4-carboxylic acid by means of a nitrating mixture of nitric and sulfuric acid, reducing the bz-nitro-3-methoxy-quinaldine-4-carboxylic acid to the corresponding bz-amino compound while using iron as the reducing agent, converting the amino compound into a 2-methyl-3-methoxy pyridine-4.5.6-tricarboxylic acid by oxidation with permanganate in the presence of alkali and decarboxylating the latter product to a 2-methyl-3-methoxy pyridine-4.5-dicarboxylic acid compound by heat treatment above 100° C. in the presence of a diluent.

9. The process which comprises nitrating a 3-methoxy-quinaldine-4-carboxylic acid by means of a nitrating mixture of nitric and sulfuric acid, reducing the bz-nitro-3-methoxy-quinaldine-4-carboxylic acid to the corresponding bz-amino compound while using iron as the reducing agent, converting the amino compound into a 2-methyl-3-methoxy pyridine-4.5.6-tricarboxylic acid by oxidation with permanganate in the presence of alkali and decarboxylating the latter product to a 2-methyl-3-methoxy pyridine-4.5-dicarboxylic acid compound by boiling with acetic anhydride.

10. The process of producing a 2-methyl-3-methoxypyridine-4.5-dicarboxylic acid which comprises oxidizing a bz-amino-3-methoxyquinaldine-4-carboxylic acid into a 2-methyl-3-methoxypyridine-4.5.6-tricarboxylic acid and decarboxylating the latter product by heat treatment to a 2-methyl-3-methoxypyridine-4.5-dicarboxylic acid.

WALTER SALZER.
HANS HENECKA.